United States Patent [19]

Kainulainen et al.

[11] Patent Number: 5,706,291
[45] Date of Patent: Jan. 6, 1998

[54] METHOD AND APPARATUS FOR CONNECTING TWO MESSAGING SYSTEMS HAVING DIFFERING SYNCHRONIZATIONS ONE OF WHICH IS MESSAGE-BASED

[75] Inventors: Jukka Kainulainen, Helsinki; Arto Peltomäki, Espoo, both of Finland

[73] Assignee: Nokia Telecommunications Oy, Espoo, Finland

[21] Appl. No.: 702,678

[22] PCT Filed: Feb. 23, 1995

[86] PCT No.: PCT/FI95/00096

§ 371 Date: Aug. 21, 1996

§ 102(e) Date: Aug. 21, 1996

[87] PCT Pub. No.: WO95/24082

PCT Pub. Date: Sep. 8, 1995

[30] Foreign Application Priority Data

Feb. 25, 1994 [FI] Finland .................. 940928

[51] Int. Cl.⁶ .................. H04J 3/06; H04L 12/46
[52] U.S. Cl. .................. 370/503; 370/508; 375/356
[58] Field of Search .................. 370/507, 350, 370/515, 503, 508, 517, 510; 375/356; 340/825.5, 825.14, 825.2, 825.21

[56] References Cited

U.S. PATENT DOCUMENTS

| | | | |
|---|---|---|---|
| 2,986,723 | 5/1961 | Darwin et al. | 340/147 |
| 4,709,347 | 11/1987 | Kirk | 364/900 |
| 4,737,850 | 4/1988 | Maisel et al. | 455/58 |
| 4,837,850 | 6/1989 | Maisel et al. | 455/58 |
| 4,860,287 | 8/1989 | Kelly | 370/108 |
| 4,939,753 | 7/1990 | Olson | 375/356 |
| 5,184,347 | 2/1993 | Farwell et al. | 370/94.1 |
| 5,384,563 | 1/1995 | Massey | 340/825.21 |
| 5,550,873 | 8/1996 | Dolev et al. | 375/354 |
| 5,594,739 | 1/1997 | Lemieux | 570/350 |

FOREIGN PATENT DOCUMENTS

| | | | |
|---|---|---|---|
| 490 315 | 6/1992 | France | H04J 3/06 |
| 94/11962 | 5/1994 | WIPO | H04J 3/06 |
| WO 94/22251 | 9/1994 | WIPO | H04L 12/48 |

OTHER PUBLICATIONS

IBM Technical Disclosure Bulletin, vol. 25, No. 11B, Apr. 1983, LS. Rogers, "Clock Source Selection Method in Distributed Communication System Networks", pp. 6293–6298.
CCITT G.703, 1991.
CCITT G.704, 1991.
ITU–T Recommunication G.708, 1993.
ITU–T Recommunication G.709, 1993.

Primary Examiner—Hassan Kizou
Assistant Examiner—A. Bnimoussa
Attorney, Agent, or Firm—Cushman Darby & Cushman IP Group of Pillsbury Madison & Sutro LLP

[57] ABSTRACT

A method for connecting a system utilizing message-based synchronization with an external system. The message-based system includes a plurality of nodes interchanging signals containing synchronization messages with information about the priority of the respective signal in the internal synchronization hierarchy of the system. For the external system to be able to utilize the message-based system as well as possible with respect to timing, synchronization status data in the internal format of the external system is transmitted from the interface node of the system utilizing message-based synchronization to the external system. The synchronization status data is converted from the message-based synchronization signature (18c) transmitted by the interface node in such a manner that the level in the internal synchronization hierarchy of the external system as indicated by the synchronization status transmittd to the external system rises or falls corresponding to the rise and, correspondingly, fall of a predetermined magnitude of the level indicated by the message-based synchronization signature.

8 Claims, 4 Drawing Sheets

METHOD AND APPARATUS FOR CONNECTING TWO MESSAGING SYSTEMS HAVING DIFFERING SYNCHRONIZATIONS ONE OF WHICH IS MESSAGE-BASED

This application claims benefit of international application PCT/FI95/00096, filed Feb. 23, 1995.

BACKGROUND OF THE INVENTION

The present invention relates to a method for connecting a system utilizing message-based synchronization with an external system, and a network arrangement according to the preamble of the appended claim 8.

An external system typically uses a synchronization method different from that of a system utilizing message-based synchronization, but in principle, an external system can also use message-based synchronization, as will be described later.

As used in the text below, the term node refers to a junction point between transmission lines in a system. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects the frequency of a signal from a neighbouring node, the frequency of its own internal clock source or a frequency applied to the node via a separate synchronization input from an external clock source as the source of its own clock frequency. In order that all nodes in the system will operate at the same clock frequency, one usually attempts to make the system to synchronize itself with a single clock source called a master source. All system nodes connected directly to the selected master source are thus synchronized with the master source, while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy can be established within the system, the system nodes interchange synchronization messages. These messages contain information by means of which individual nodes are able to select a timing source. The system nodes are prioritised and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighbouring node clock frequency which originates from a desired node and which is of the highest quality can be selected by an individual node as the source of its own clock frequency. At the system start-up each node selects its own internal clock source as the source of its clock frequency as it has not yet processed any incoming synchronization messages. After the node has processed the first incoming synchronization messages, it selects the clock frequency of a neighbouring node having the highest level of priority as the source of its clock frequency. After all messages have been distributed over the system and the system has achieved a stable state as far as synchronization is concerned, the system has been synchronized hierarchically with the clock frequency of the master source.

Figure 1:
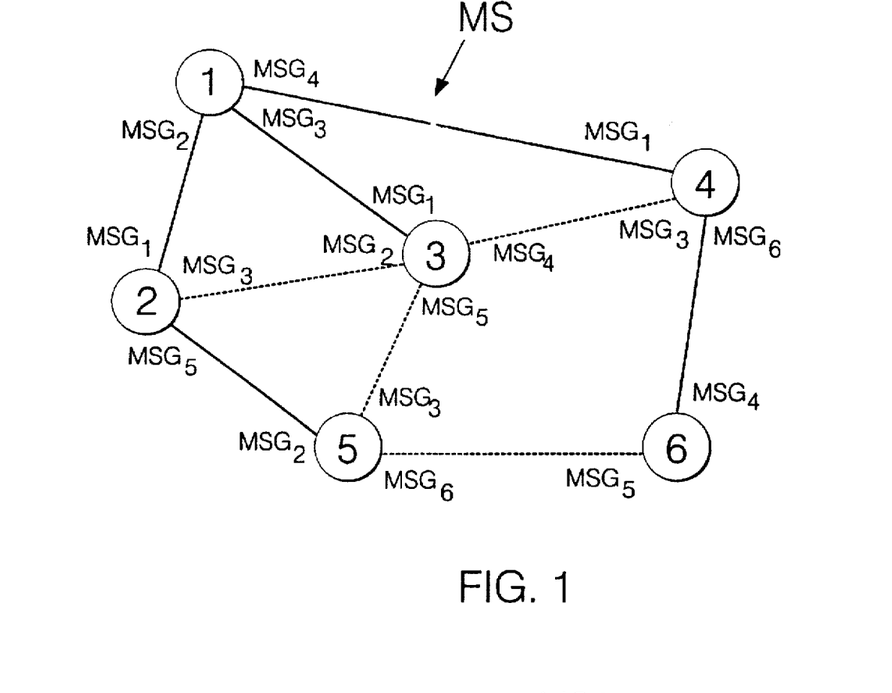
FIG. 1 illustrates a system employing message-based synchronization when the system is in synchronization with the clock frequency of the master source.

FIG. 1 shows a system MS utilizing message-based synchronization in a stable situation. Priorities assigned to the nodes are indicated by numbers within the circles representing the nodes. The smaller the number, the higher the priority of the node. Synchronization messages transmitted by a node n (n=1 ... 6) are indicated by the reference MSGn. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the nodes by assigning each node a dedicated signature indicating the hierarchical level of the node and that the system synchronizes itself with the defined master clock independently by utilizing, if required, all existing internodal connections. If the connection to the master clock fails, and no alternative connection exists, or if the master clock fails, the system synchronizes itself with a node of the next highest level of hierarchy. Response to a change in synchronization takes place by message interchange between nodes.

Message-based synchronization methods of the type described above are described e.g. in U.S. Pat. Nos. 2,986,723 and 4,837,850, which are referred to for a more detailed description. Messages used in one prior art message-based synchronization method (SOMS) will be described more closely below with reference to FIGS. 2 and 3.

A system employing message-based synchronization forms a kind of closed system, at least as far as synchronization is concerned (often also with respect to data transmission). This is problematic as there nevertheless exists a need to interconnect different types of networks and thus also a need for the interconnected systems to be able to make use of each other also with respect to timing.

SUMMARY OF THE INVENTION

The object of the present invention is thus to provide a network arrangement by means of which one or more external systems are able to utilize a system employing message-based synchronization also with respect to timing as well as possible.

The idea of the invention is to change the synchronization status to be transmitted to an external system dynamically in such a manner that it corresponds to the synchronization state of a system utilizing message-based synchronization. (Synchronization status reveals the quality or priority of the clock frequency of the source of synchronization in the internal synchronization hierarchy of a system. Synchronization status is given in a synchronization message or as a separate bit/bit pattern in a position assigned to it in the frame structure of a signal.)

Due to the solution provided by the invention, an external system is able to effectively utilize a message-based system in its synchronization, because it is aware of the synchronization state of the message-based system. The use of the external system connection for the internal synchronization of the message-based system is also facilitated when the solution of the invention is utilized.

BRIEF DESCRIPTION OF THE DRAWINGS

In the following, the invention and its preferred embodiments will be described in more detail with reference to the examples shown in FIGS. 2 to 6 of the attached drawings, in which.

DETAILED DESCRIPTION

Figure 2:
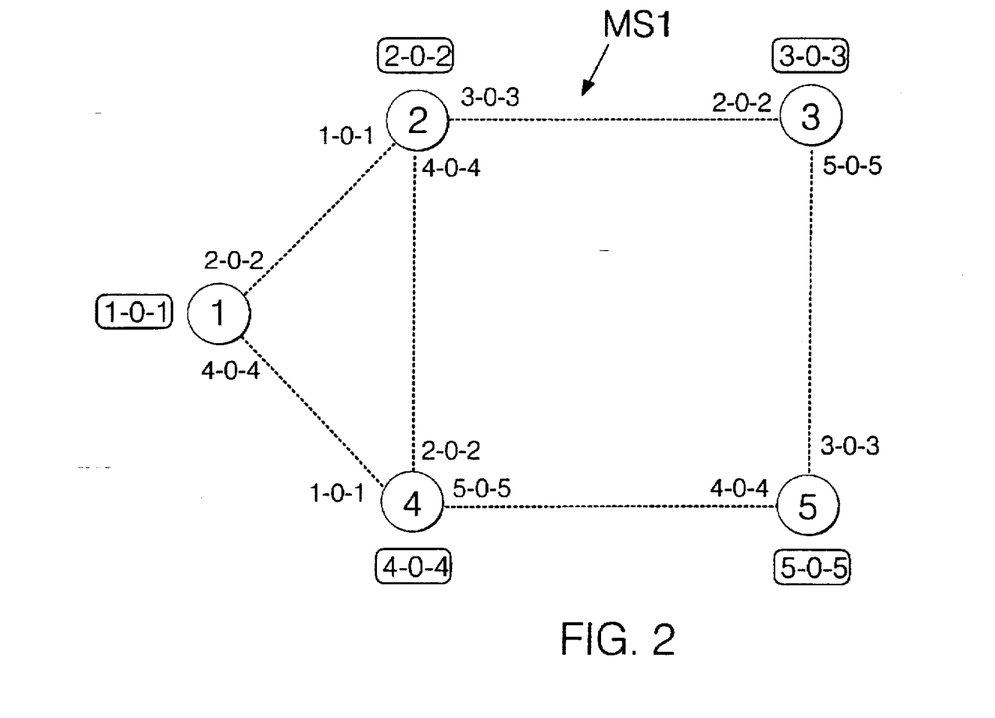
FIG. 2 illustrates a network employing self-organizing master-slave synchronization (SOMS) in its initial state.

FIG. 2 illustrates a system employing self-organizing master-slave synchronization (SOMS), which is a message-based synchronizing method known per se. In this specific case, the system comprises five nodes (or devices) assigned SOMS addresses indicated by the reference numerals 1 ... 5 according to their level of hierarchy. (The master node of the system has the smallest SOMS address.) The nodes interchange messages containing such SOMS addresses. In this way, the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a parameter describing the quality of the connection, typically a distance to a node indicated by D1. The distance is given as the number of intermediate nodes.

D3 is the SOMS address of a transmitting node.

Each node (or device) compares continuously incoming SOMS signatures with each other and selects the smallest amongst them. In the signature the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master node, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighbouring nodes as its new synchronization source on the basis of an incoming SOMS signature, it has to regenerate its own SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of clock frequency. Of course, the outbound SOMS message thereby employs the internal SOMS signature.

The nodes transmit continuously SOMS messages in all directions in order that any changed data in the SOMS signatures is distributed as rapidly as possible and that they know the current operating condition of neighbouring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison, if the message is faultless. When the incoming transmission line has an accepted SOMS signature and faultless messages containing the same signature are received continuously, the situation remains unchanged. If the SOMS message is found to be faulty, the current SOMS signature is retained until three successive faulty SOMS messages have been received. At this stage, the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to three successive SOMS messages. If the line fails totally, the SOMS signature is rejected immediately. If no appropriate SOMS signature is available for comparison due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way, there will be no unnecessary delays in network changes.

Initially, each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 2, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 2, the SOMS signatures are indicated beside each node to which they are transmitted, and the selected signature is written within the frame (in the initial situation shown in FIG. 2 all nodes employ their internal timing source). Lines used in synchronization are drawn as a continuous line and standby lines are drawn as a broken line (in the initial situation shown in FIG. 2, all lines are standby lines).

Figure 3:
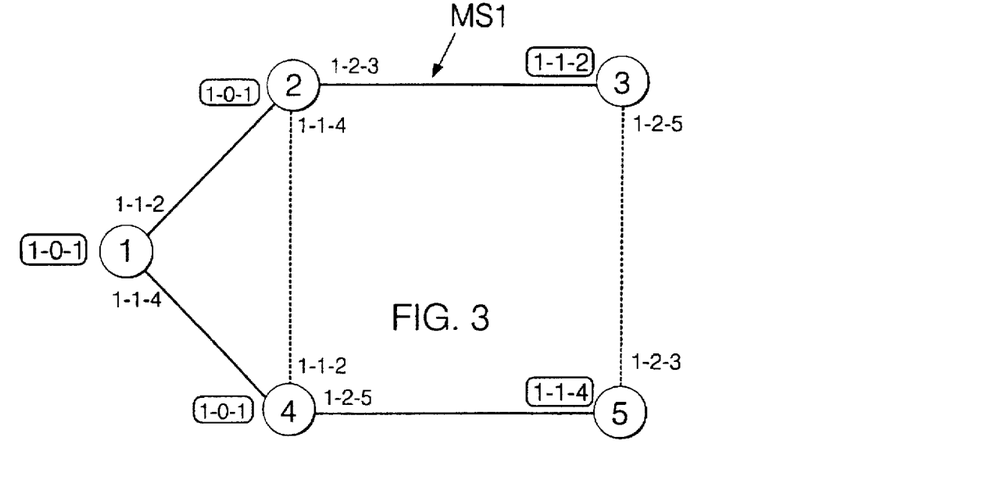
FIG. 3 illustrates the network of FIG. 2 in a stable state.

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time, the nodes generate their own new SOMS signatures as described above and provide their outbound SOMS message with the new signature. The network in a stable situation is shown in FIG. 3. All the nodes have synchronized with the master node 1 over the shortest possible path.

In order for an external system to be able to utilize the message-based system described above with respect to synchronization (to use the message-based system as a source of synchronization), an interface is provided between the system utilizing message-based synchronization and the external system, through which interface synchronization status data is transmitted to the external system, this data corresponding to the synchronization state of the message-based system at a given moment.

Figure 4A:
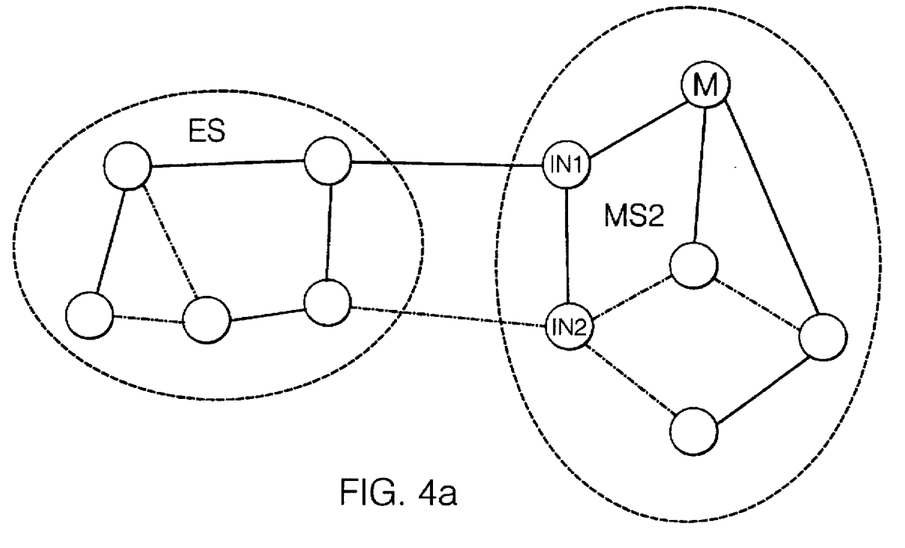
FIG. 4a illustrates schematically the connection of a system utilizing message-based synchronization with an external system, when one connection between the systems is used for synchronization.
Figure 4B:
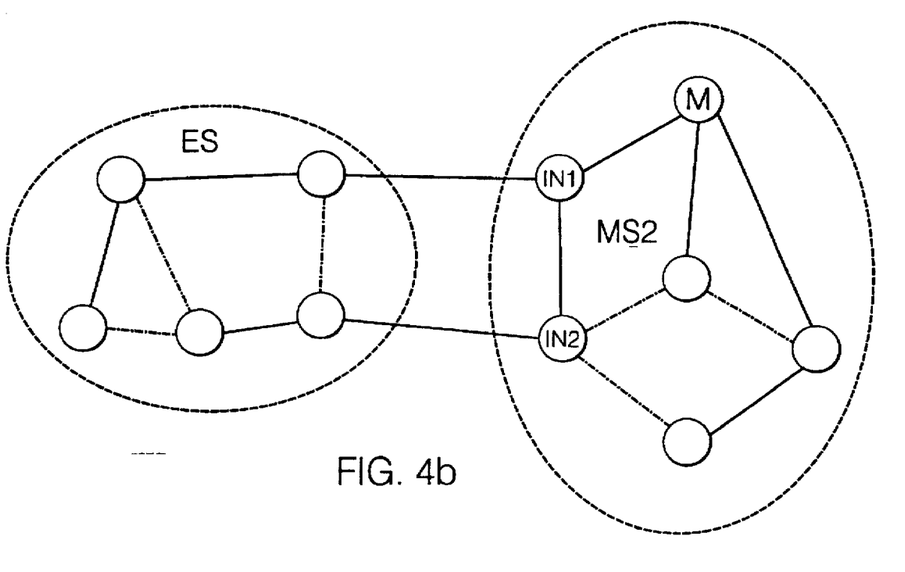
FIG. 4b illustrates schematically the connection of a system utilizing message-based synchronization with an external system, when two connections between the systems are used for synchronization.

FIGS. 4a and 4b illustrate schematically the connection of a network MS2 utilizing message-based synchronization with an external system ES. The external system may be, for instance, a local network and the message-based system may be a long-distance trunk network, or the external system may be a dedicated network and the message-based system may be a public network maintained by a teleoperator. The nodes, which are indicated by mere circles, except the master node indicated by the reference M and the interface nodes of the network MS2 by the references IN1 and IN2, are thus conventional telecommunication network elements and the connections between them typically 2 Mbit/s PCM connections according to CCITT recommendations G.703 and G.704.

In the example of FIG. 4a, only one connection (continuous line) between the systems is used for synchronization, whereas in the example of FIG. 4b, both connections between the systems are used for synchronization (conversion is carried out in both interface nodes).

Two alternatives can be used in implementing the solution of the invention, depending on which part of the interface node (IN1 or IN2) the conversion is carried out in:

1. The conversion can be carried out in the message-processing part of the interface unit of the node, the signature of the message-based system transmitted to the interface units by the decision-making part of the control unit being converted into a form required by the external system only in the interface unit.

2. The conversion can be carried out by the synchronization decision-making part of the control unit of the node, whereby it forms a synchronization signature in accordance with the external system at the same time it forms the node's own outbound synchronization signature in accordance with the message-based system.

Figure 5:
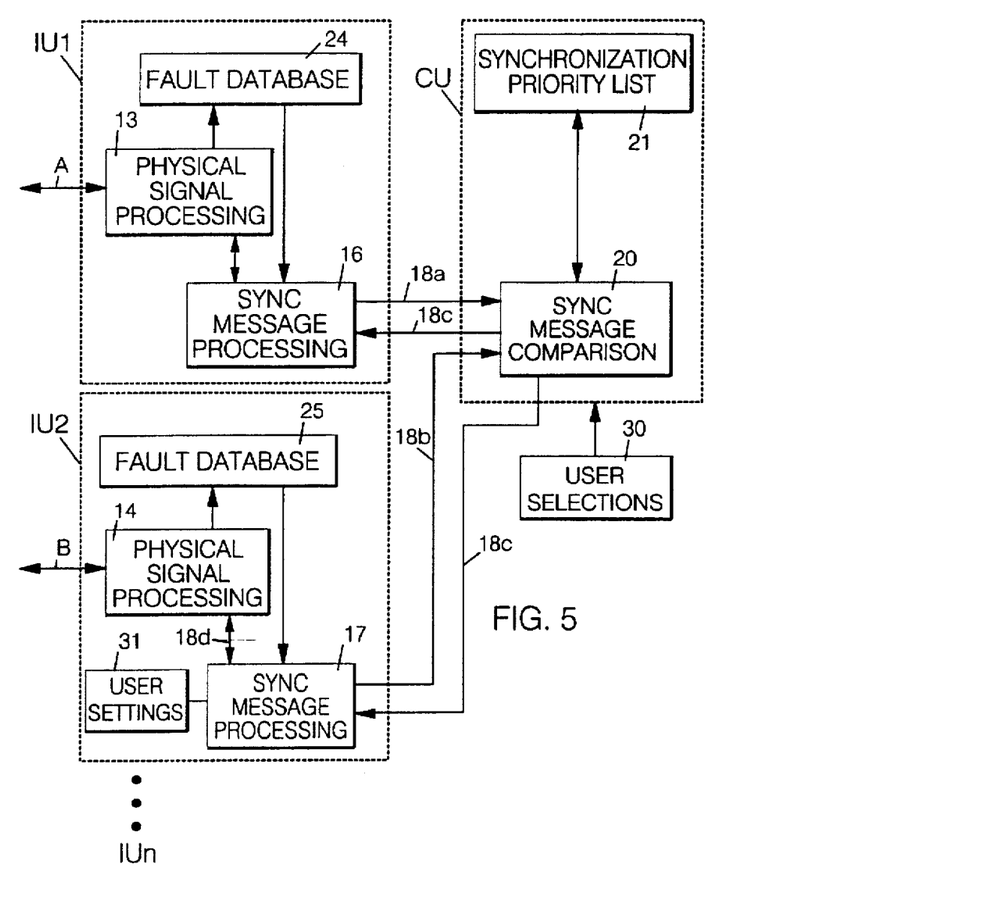
FIG. 5 illustrates the signature formation according to the invention in a first embodiment of the invention.
Figure 6:
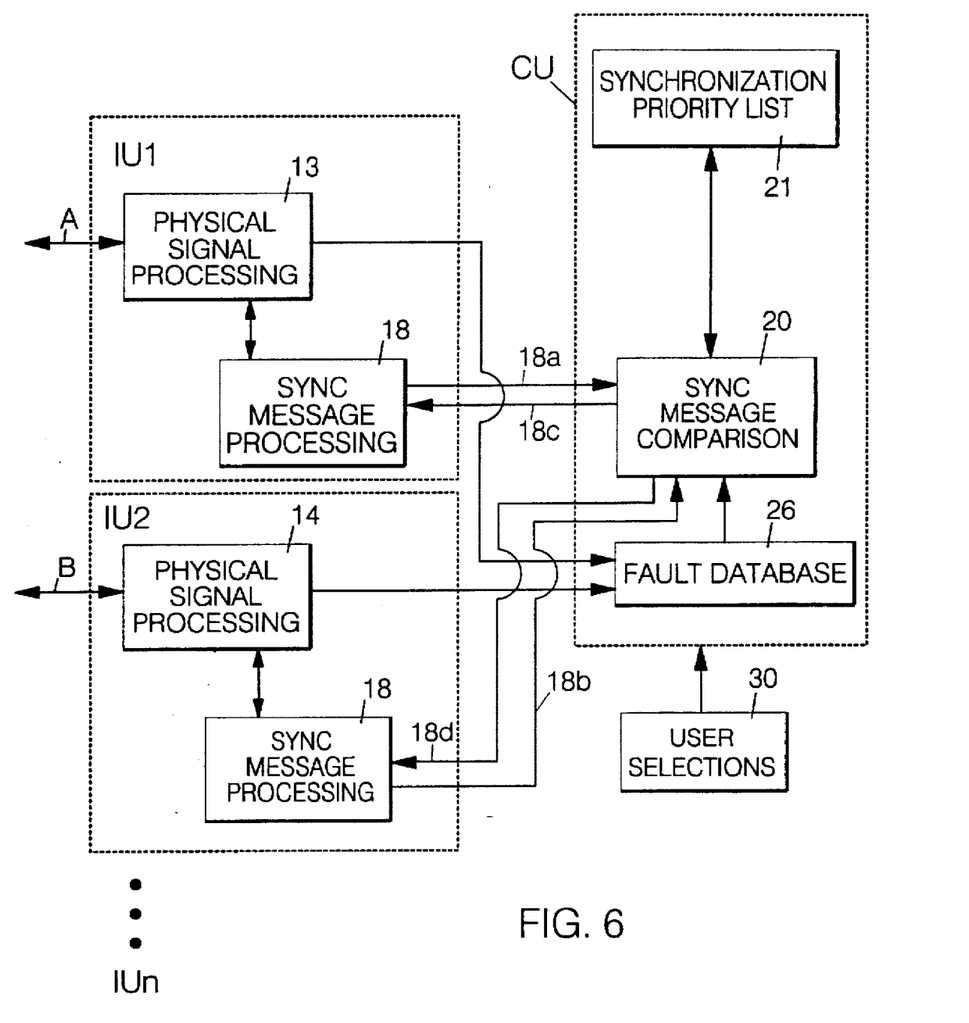
FIG. 6 illustrates the signature formation according to the invention in a second embodiment of the invention.

These alternatives are illustrated in FIGS. 5 and 6, which show the elements relating to conversion in the interface node IN1 or IN2 of a system using message-based synchronization.

FIG. 5 illustrates the conversion taking place in the interface unit IUn (n=1, 2, ...) of a node of a message-based system. The figure shows two connections (A and B) coming into (and going out of) the device (node) of the system, the connection A connecting to the interface unit IU1 of the node and the connection B connecting to the interface unit IU2 of the node. The connection A is connected to a node included in the system, the signals received from the connection thus including synchronization messages, which a signal transmitting and receiving unit 13 extracts and transmits further to a synchronization message transmitting and receiving part 16 connected thereto. The synchronization message transmitting and receiving part verifies that the message is faultless and transmits the message 18a further to the synchronization decision-making part 20 of the device, located in the centralized control unit CU of the node. The signal transmitting and receiving unit 13 also monitors the quality of the signal and stores data on it in a first fault database 24 located in the interface unit. The synchronization message transmitting and receiving part 16 also receives the data on faults from the database 24. If the incoming signal A is not acceptable as regards synchronization, the synchronization message transmitting and receiving part 16 forbids using it. This can be done by a separate forbiddance or by setting the value of the incoming signature as the highest possible, whereby, in practice, it is not used for synchronization in any case in the latter case.

The decision-making part 20 of the control unit CU performs the comparison of the synchronization messages received from all the interface units IUn communicating with the nodes of the message-based system, and forms a synchronization priority list on the basis of them, this list being stored in a memory 21. In the highest level of the priority list is the used clock source with the "best" synchronization signature according to the used message-based synchronization method. From this signature, the decision-making part 20 forms the node's own outbound signature 18c, which it transmits to the message transmitting and receiving parts of all the interface units. In the interface units which are connected to the external system, as in the interface unit IU2 in the example of FIG. 5, the conversion of synchronization status according to the invention is carried out. To put it more accurately, this takes place in a synchronization message transmitting and receiving part 17, which applies the data which are obtained as a result of the conversion and which represent the status of the external system to a signal transmitting and receiving part 14, which forms a signal to be transmitted to the external system.

FIG. 6 illustrates the other alternative of practical implementation: providing the synchronization signature/synchronization status of the external system in a centralized manner together with providing the signatures of the message-based system. Also in this case, the connection A is connected to the internal device of the system MS2, a signal received from the connection thus containing a synchronization message. The signal receiving part 13 transmits the synchronization message to an interface-specific synchronization message transmitting and receiving part 18 connected thereto, the output of which is connected to the common decision-making part 20 of the node located in the control unit CU. The receiving part 18 checks the message 18a and then transmits it to the synchronization decision-making part 20, which forms a synchronization priority list in the memory 21. The receiving part 13 transmits the data on faults of the signal received from the connection A directly to the centralized fault database 26 of the device, from which database the decision-making part 20 receives the information and is thus able to indicate the synchronization signature of the signal A to be useless during faults.

The decision-making part 20 of the control unit CU performs the comparison of the synchronization messages received from all the interface units IUn communicating with the nodes of the message-based system, and forms a synchronization priority list on the basis of them, this list being stored in the memory 21. In the highest level of the priority list is the used clock source with the "best" synchronization signature according to the used message-based synchronization method. From this signature, the decision-making part 20 forms the node's own outbound signature 18c, which it transmits to the message transmitting and receiving parts of all those interface units (in the figure, only the interface unit IU1) which communicate with a node of the message-based system. When the decision-making part has formed the signature 18c, it performs the conversion of this signature in the manner according to the invention. After this, the decision-making part transmits the signature/status 18d obtained as a result of the conversion to the synchronization message transmitting and receiving parts 18 of those interface units which communicate with the external system (interface unit IU2 in the example of the figure).

The conversion can also be carried out on the basis of a message-based synchronization signature received from the selected source of timing, because the synchronization signature and the message-based synchronization signature transmitted by the node are interdependent.

It should also be noticed that the interface units of the node can transmit synchronization messages/statuses of different types. In other words, the same node may communicate with several external systems, the internal synchronization methods of which may be different among themselves.

The conversion of an outbound synchronization status is carried out either in a decentralized manner in the interface units or in a centralized manner in the control unit. In the examples of FIGS. 5 and 6, the fault database of the interfaces is located accordingly; when a signature is converted in the interface unit, the fault database is also located in the interface unit, and when a signature is converted in the control unit, the fault database is also located in the control unit. The practical applications are not, however, restricted to the solutions according to the above-mentioned examples. The fault database can be located for instance in a different unit than the one in which the conversion is carried out. On the other hand, the fault database can also be located both in the interface units and the control unit. In this case, each interface is aware of its own faults, but they are gathered in a centralized manner also to the control unit. This is the most preferred manner of implementation, but the use of the idea of the invention is however not restricted to any alternative of implementing the database.

In the nodes according to FIGS. 5 and 6, it is also possible to convert synchronization statuses of signals arriving from the external system, even if this type of conversion is not necessary as such, because it is not necessary for a message-based system of an upper level to know the status data of an external system of a lower level. This type of conversion taking place in the other direction is described in more detail in a parallel Finnish Patent Application No. 940927. (The manner of conversion (centralized or distributed to the interface units) of outbound signatures is in no way dependent on the processing of incoming signatures, either. In other words, the incoming signatures can be converted either in a decentralized manner in the interface units or in a centralized manner in the control unit, entirely independently of how the conversion of the outbound signatures is carried out).

The signal to be transmitted to the external system ES is, for instance, a PCM connection according to CCITT recommendations G.703 and G.704, as stated earlier, or a signal according to recommendations G.708 and G.709, in which case an SDH network is concerned. In the following, the exemplifying situation is one where the external system is a system utilizing LP synchronization known as such, the system being connected to a system utilizing message-based synchronization by one or more 2 Mbit/s PCM connections, and the system utilizing message-based synchronization is a SOMS network as described above.

LP synchronization (Loop Protected) is an expansion of independent master-slave synchronization (used, for instance, in some commercially available node devices of Nokia Telecommunications Oy. In independent master-slave synchronization, each node makes its own decision concerning its synchronization without obtaining any information from the outside which would support the decision-making. Since the nodes make their own decisions on synchronization independently, each node must be provided with definitions of with which node it will synchronize itself. These definitions are typically made in the form of the priority list mentioned above, a node thus selecting among the suitable incoming signals the one having the highest priority, i.e. the one with the highest position on the list, as its source of synchronization. If this signal is interrupted or its quality weakens to such a degree that it cannot be accepted as the source of synchronization any more, the node selects the signal having the next highest priority from the list. The priority list must be constructed in such a manner that all the nodes included in it are located between the node concerned and the master node, the synchronization thus spreading from the master node to the lower levels.

LP synchronization helps to maintain the desired timing in loop networks by using two status bits mcb (master control bit) and lcb (loop control bit) in addition to the priority lists mentioned above, these status bits being transmitted between network nodes. It is thus possible to define also such sources to be included in the priority lists which are not located between the node concerned and the master node. The first status bit mcb indicates whether the synchronization originates from the master node of the network. The master node defined for the network transmits this bit as a logical zero in its outbound signals, and the other nodes forward it further if they are synchronized with a signal in which the value of the mcb bit is zero. The second status bit lcb indicates whether the synchronization comprises a loop. Each network node transmits this bit as a logical one in the direction with which it has synchronized itself and as a logical zero in other directions.

Each node uses its own priority list when selecting the source of synchronization, but it also checks the mcb and lcb bits in addition to checking the state of the signal before making a choice. A node primarily tends to find a connection the clock frequency of which originates from the master node of the network (mcb=0). If there are several of these connections, the one in the highest level of the priority list is selected. If this type of connection cannot be found (due to a fault), the node selects a working connection which has the highest position on the priority list in the normal manner. However, it is always required of the selected connection (the source of timing) that its timing is not in a loop (lcb=0), even if the actual signal were suitable for synchronization in other respects.

Since LP synchronization is a synchronization method known as such, it will not be described any further in this context. LP synchronization has been described in more detail, for instance in a Master's Thesis by Jukka Kainulainen "Sanomapohjainen alistuva synkronointi digitaalisissa televerkoissa", Technical University, Faculty of Information Technology, Espoo, 1993. LP Synchronization has also been described for instance in Finnish Patent Application No. 931166, which is also referred to for a more detailed description.

The status bits lcb and mcb of the external system ES using LP synchronization can be transmitted for instance in bits selected by the user in the time slot TS0 (in which case bits 4–8 can be used in every other frame, because in every other frame there is a frame alignment signal in the time slot TS0), or, for instance, in bits 7 and 8 when the user selects the time slot TSN (N=1 . . . 31). In the latter case, the required capacity must be taken from the capacity assigned to the payload.

The table below shows one example of conversion, which is carried out on the interface between the systems, i.e. in the manner described above either in the synchronization message receiving and transmitting part of the interface node or in the decision-making part of the interface node.

| SOMS signature t | mcb bit | lcb bit |
| --- | --- | --- |
| t<100-0-0 | 0 | 0 |
| 100-0-0≦t<500-0-0 | 1 | 0 |
| 500-0-0≦t<MAX-0-0 | 0 | 1 |
| MAX-0-0≦t | 1 | 1 |

The table shows the SOMS signature t going out of a node and the outbound mcb and lcb bits, which the message-based system forms automatically for the signals of the external system when the node's own outbound SOMS signature has been formed. The figures (100, 500 and MAX) appearing as the conversion limits of the SOMS signature are mere examples and only represent the mutual magnitude of the figures.

If the external system is, for instance, the system described in the above-mentioned U.S. Pat. No. 4,837,850 instead of a system using LP synchronization, the conversion can be carried out for instance in the following way.

| SOMS signature t | Clock message T |
| --- | --- |
| t<100-0-0 | 1/D1 |
| 100-0-0≦t<500-0-0 | 2/D1 |
| 500-0-0≦t | 3/D1 |

The clock message examples correspond to the clock messages described in U.S. Pat. No. 4,837,850. In an outbound clock message, D1 refers to the first part of the outbound SOMS signature, this part representing the level of the main clock. The figures (100, 500 and MAX) appearing as the conversion limits of the SOMS signature are mere examples and only represent the mutual magnitude of the figures. The general rule in this example is, however, that the value (D1) describing the level of the main clock in the SOMS network is transmitted as such to the system according to the U.S. Patent as the synchronization signature of the clock message.

The conversion examples presented above relate to cases in which conversion rules are stored fixedly in the node in advance, for instance at the installation stage of the equipment. The user can also define the interface between the systems, however. The user thus defines how the synchronization signature of a message-based system is converted into the status data of an external system. This is carried out, for instance, by defining certain class limits, a synchronization signature belonging to each class being thus converted into a certain synchronization status of the external system. For instance, in connecting SOMS and LP synchronizations, the user is allowed to define himself or herself the limits at which mcb and lcb bits are transmitted as zero and as one. In FIGS. 5 and 6, the selections defined by the user via the user interface of the device are denoted by a block 30. In the embodiment of FIG. 5, the settings determined by the user are stored in the interface unit IU2 (memory location 31) so that the interface unit is able to convert the outbound signature correctly.

The table below shows an example of the interface between a system using LP synchronization and a SOMS network, it being possible for the user to define this interface. The user defines the integer values x and y appearing in the table, however in such a manner that x<y<MAX.

| SOMS signature t | mcb bit | lcb bit |
| --- | --- | --- |
| t<x-0-0 | 0 | 0 |
| x-0-0≦t<y-0-0 | 1 | 0 |
| y-0-0≦t<MAX-0-0 | 0 | 1 |
| MAX-0-0≦t | 1 | 1 |

If the external system is the system described in the above-mentioned U.S. Pat. No. 4,837,850, the conversion can be carried out, for instance, in the following manner. The user defines the values x and y appearing in the table in such a manner that x<y.

| SOMS signature t | Clock message T |
| --- | --- |
| t<x-0-0 | 1/D1 |
| x-0-0≦t<y-0-0 | 2/D1 |
| y-0-0≦t | 3/D1 |

Also in this case, D1 refers to the first part of the outbound SOMS signature.

If the external system is also a SOMS system, the conversion can be carried out, for instance, in the manner shown in the table below. In this case, the user defines the values x, y, a, b and c (x<y and a<b<c). In the example, it is assumed that the middle parameter D2 representing the quality of the synchronization connection in the two different SOMS systems relates to a different quality parameter, in both of which the value zero represents the best possible state with respect to the parameter.

| SOMS signature t1 | SOMS signature t2 |
| --- | --- |
| t1<x-0-0 | a-0-D3 |
| x-0-0≦t1<y-0-0 | b-0-D3 |
| y-0-0≦t1 | c-0-D3 |

D3 is (according to what has been shown above) the last (third) part of the outbound SOMS signature.

The SOMS networks connected in the manner described above have the advantage over one (larger) SOMS network that by means of the interface of the invention, it is possible to filter the changes that are insignificant as regards synchronization and to take into account only those changes occurring in the message-based system which are significant to synchronization. In this manner, it is possible to remove unnecessary message traffic from the network.

In general, it can be stated that the interface that can be defined by the user in the manner described above enables a flexible connection between systems, because the user can define the class limits described above, whereby the synchronization hierarchy of different systems can be established in the desired manner.

Although the invention has been described above with reference to the examples according to the accompanying drawings, it will be apparent that the invention is not so restricted but it can be modified within the scope of the inventive idea presented above and in the appended claims. A more accurate implementation will thus largely depend on the type of the networks concerned. Since the conversion can also be carried out on the basis of the message-based synchronization signature received from the selected source of timing, the synchronization signature transmitted by an interface node, this signature being mentioned as the basic data of conversion in the appended claims, must be understood in a broader sense as any data having a certain relationship with this signature, the data describing the state of synchronization in the node concerned.

We claim:

1. A method for connecting a system utilizing message-based synchronization and including a plurality of nodes interchanging signals containing synchronization messages with information about the priorities of the respective signals in an internal synchronization hierarchy of the system utilizing message-based synchronization, with an external system having an internal format which has an internal synchronization hierarchy characterized by having plural levels said method comprising:

connecting the external system to the system utilizing message-based synchronization by transmitting synchronization status data in the internal format of the external system from an interface node of the system utilizing message-based synchronization to the external system;

converting said synchronization status data from a message-based synchronization signature indicating a level, as transmitted by the interface node, in such a manner that the level in the internal synchronization hierarchy of the external system as indicated by the synchronization status transmitted to the external system rises or falls corresponding to the rise and, correspondingly, fall of a predetermined magnitude of the level indicated by the message-based synchronization signature.

2. A method according to claim 1 further including:

causing said connecting to take place automatically by using conversion rules stored fixedly in said system using message-based synchronization.

3. A method according to claim 1, further including causing said converting to take place by using a user of the system using message-based synchronization.

4. A method according to claim 1, comprising:

carrying out said converting in a respective signal interface of the respective said interface node from which synchronization status data is transmitted to the external system.

5. A method according to claim 1, comprising:

carrying out said converting in a centralized manner in a decision-making part of the respective said interface node.

6. A method according to claim 1 wherein:

said external system is one utilizing LP synchronization and said system utilizing message-based synchronization is a SOMS network and wherein said connecting includes determining four threshold values for the best SOMS signature arriving in the respective said node, said threshold values defining four areas for said signature, each of which corresponds to one of the four bit combinations of the mcb and lcb bits of said LP synchronization.

7. A method according to claim 1 wherein said system utilizing message-based synchronization is a SOMS network, and wherein said connecting includes transmitting a value describing the level of the main clock in the SOMS network, as such, to said external system as the synchronization signature of a clock message.

8. A network arrangement, comprising:

a message-based system utilizing message-based synchronization, said message-based system comprising a plurality of nodes interchanging signals containing synchronization messages with information about the priority of the respective signals in an internal synchronization hierarchy of said message-based system;

said nodes including at least one interface node comprising:

converting means for converting a message-based synchronization signature transmitted by said interface node into synchronization status data in the internal format to an external system in such a manner that the level in the internal synchronization hierarchy of the external system as indicated by the synchronization status transmitted to the external system rises or falls corresponding to the rise and, correspondingly, fall of a predetermined magnitude of the level indicated by the message-based synchronization signature to obtain a conversion result;

transmitting means for transmitting the conversion result to the external system.

* * * * *